United States Patent
Du et al.

(10) Patent No.: US 9,654,939 B2
(45) Date of Patent: May 16, 2017

(54) APPARATUS AND METHOD FOR INCORPORATING MULTIPLE TALK GROUPS IN A SINGLE CALL

(71) Applicant: MOTOROLA SOLUTIONS, INC, Schaumburg, IL (US)

(72) Inventors: Quan-Wen Du, Chengdu (CN); Yong Huang, Chengdu (CN); Yu-Yang Zheng, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/030,896

(22) PCT Filed: Dec. 12, 2013

(86) PCT No.: PCT/CN2013/089282
§ 371 (c)(1),
(2) Date: Apr. 21, 2016

(87) PCT Pub. No.: WO2015/085556
PCT Pub. Date: Jun. 18, 2015

(65) Prior Publication Data
US 2016/0286364 A1    Sep. 29, 2016

(51) Int. Cl.
*H04H 20/71* (2008.01)
*H04W 4/10* (2009.01)
*H04W 4/06* (2009.01)

(52) U.S. Cl.
CPC ............... *H04W 4/10* (2013.01); *H04W 4/06* (2013.01)

(58) Field of Classification Search
CPC ........................................ H04W 4/10
USPC ........................................................... 370/312
See application file for complete search history.

(56) References Cited

U.S. PATENT DOCUMENTS

| | | | |
|---|---|---|---|
| 6,882,856 | B1 | 4/2005 | Alterman et al. |
| 7,317,695 | B2 | 1/2008 | Mayer et al. |
| 7,567,662 | B1 | 7/2009 | Renner et al. |
| 8,175,241 | B2 | 5/2012 | Nguyen |

(Continued)

FOREIGN PATENT DOCUMENTS

| | | |
|---|---|---|
| CN | 101316397 | 12/2008 |
| CN | 101335928 A | 12/2008 |

(Continued)

OTHER PUBLICATIONS

The International Search Report and The Written Opinion, SN: PCT/CN2013/089282, filed: Dec. 12, 2013, mailed: Sep. 26, 2014, all pages.

*Primary Examiner* — Chirstopher R Crompton (57) ABSTRACT

A radio receives a call including a call include bitmask (CIB). The radio retrieves a call include list (CIL) that, for each bit position in the CIB, maps the bit position to one of a radio identifier, a talk group identifier, and a sub-CIL. The radio determines that one bit position in the CIB is set to a value indicating that a radio associated with a radio identifier mapped to the bit position in the CIB via the CIL or to a talk group identifier mapped to the bit position in the CIB via the CIL are to be included in the call. The radio matches its identifier to the radio identifier mapped to the bit position or matches a talk group to which it subscribes to the talk group identifier mapped to the at least one bit position and unmutes the call.

20 Claims, 5 Drawing Sheets

(56) References Cited

U.S. PATENT DOCUMENTS

| | | |
|---|---|---|
| 8,249,571 B2 | 8/2012 | Jacobstein et al. |
| 9,161,178 B2 | 10/2015 | Chen et al. |
| 2003/0083086 A1 | 5/2003 | Toyryla et al. |
| 2003/0186716 A1* | 10/2003 | Dorenbosch ........ H04W 72/005 455/519 |
| 2006/0111135 A1 | 5/2006 | Gray et al. |
| 2007/0047715 A1 | 3/2007 | Madhusudan et al. |
| 2007/0121859 A1 | 5/2007 | Smelyansky et al. |
| 2014/0237587 A1* | 8/2014 | Forbes .................... G06F 21/00 726/18 |

FOREIGN PATENT DOCUMENTS

| | | |
|---|---|---|
| CN | 103024686 | 4/2013 |
| EP | 2221980 A1 | 8/2010 |

* cited by examiner

APPARATUS AND METHOD FOR INCORPORATING MULTIPLE TALK GROUPS IN A SINGLE CALL

BACKGROUND OF THE INVENTION

In a two-way radio system, each radio typically communicates with one group of radios at a time. For example, a firefighter may be affiliated with a firefighter talk group and a police officer may be affiliated with a police talk group. Under normal circumstances, although the firefighter may not be able to communicate with the police officer because they belong to different groups, with the addition of features such as a scan feature, a receive group list feature and a priority monitoring feature, a radio affiliated with one group may monitor the audio from multiple groups. In addition, when an incident event occurs, multiple radios or groups of radios may be merged or re-grouped into a single common group using a dynamic regrouping feature, a console patching feature, and/or a multi-select feature.

With the dynamic regrouping feature, a system controller or dispatcher may notify radios affiliated with different groups of a new common group so that the radios from different groups can seamlessly communicate with each other via the new common group. The dispatcher remotely redirects individual radios to the common group, without any intervention from the radio operators. With the console patching feature, the dispatcher temporarily reassigns different groups to a single group, called a super group. Radios temporarily reassigned to the super group may then communicate with each other on the super group. The multi-select feature allows the dispatcher to merge several talk groups together on one voice channel to participate in a single conversation. Using the multi-select feature, a console operator can talk to and listen to all of the selected talk groups. However, the members of the individual talk groups cannot talk to or listen to members of other talk groups.

These features all require infrastructure, for example, a console operator or dispatcher, to merge or regroup radios into the super group and/or common group. If the console operator is unavailable, for example, in situations where there is a power interruption, these features will not work. These regrouping procedures also require that the dispatcher send a merge or regroup command and that all the target radios receive the merge or regroup command before starting the call on the super group and/or common group. This has a disadvantageous effect of increasing the time required to set up the call on the super group and/or common group.

Accordingly, there is a need for an improved apparatus and method for incorporating multiple talk groups in a single call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for inviting one or more receiving radios to join a call. A radio receives a call including one of a header and an embedded control signaling including a Call Include Bitmask (CIB). The radio retrieves a Call Include List (CIL) that, for each bit position in the CIB, maps the bit position to a radio identifier, a talk group identifier, or sub-CIL that includes a further listing of two or more of radio identifiers or talk group identifiers. The radio determines that at least one bit position in the CIB is set to a value indicating that receiving radios associated with one or more radio identifiers mapped to the at least one bit position in the CIB via the CIL or associated with one or more talk group identifiers mapped to the at least one bit position in the CIB via the CIL are to be included in the call. The radio matches its radio identifier to one or more radio identifiers mapped to the at least one bit position in the CIB via the CIL or matches a talk group to which it subscribes to the one or more talk group identifiers mapped to the at least one bit position in the CIB via the CIL. Responsive to matching, the radio unmutes the call.

Figure 1:
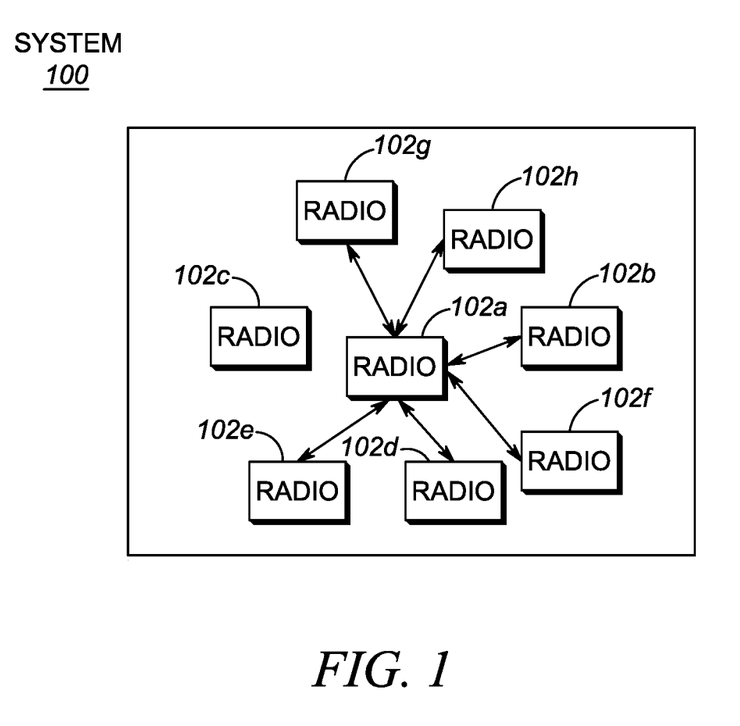
FIG. 1 is a block diagram a system used in accordance with some embodiments.

FIG. 1 is a block diagram of a system used in accordance with some embodiments. The system includes multiple radios 102 (i.e., radios 102a-102h) configured to communicate with each other in conventional mode or trunked mode, and direct mode or repeater mode. Radios 102 may be, for example, portable two-way radios or mobile radios that are configured to communicate with each other and with a system controller/dispatcher. Each radio 102 may access one or more Call Include Lists (CIL), each of which is configured to include one or more individual radio identifiers (IDs), one or more talk group IDs and/or one or more IDs for other CILs (referred to as sub-CIL(s)). Subsequent to accessing a CIL, a sending radio may select one or more receiving radios to participate in one voice or data call (referred to simply as a call). The sending radio may select the receiving radios either by selecting the individual radio IDs, the talk group IDs for talk groups with which the receiving radios are affiliated, or a sub-CIL in which the receiving radios are included in the accessed CIL. The sending radio may generate a Call Include Bitmask (CIB) that includes bits mapped to the selected individual radio IDs, talk group IDs and/or IDs for sub-CILs in the accessed CIL.

Consider an example where during an ongoing call or at the start of a new call sending radio 102a wants to include one or more radios that are not affiliated with a talk group with which radio 102a is affiliated. To include those radios in the call, the user of radio 102a may select the IDs for those individual radios, the talk groups to which those radios belong, and/or sub-CILs in which the radios are included from at least one CIL. Radio 102a generates a CIB according to the selection, wherein the CIB generated by radio 102a includes bits that are mapped to the selected radio IDs, talk group IDs and/or sub-CIL IDs included in the accessed CIL. When a push-to-talk button is pressed on radio 102a to initiate or continue the call, radio 102a broadcasts the CIB via, for example, a voice header, a data header, or a link control message, depending on the system configuration, in some embodiments in place of or in addition to identifying a target talkgroup or radio identified in a target address of the voice header, data header, or link control message. Each receiving radio parses the received CIB, and in some embodiments the target address as well, to determine whether a bit position in the CIB is mapped to the receiving radio ID in the CIL and is set to a value that indicates that the receiving radio is selected to participate in the call. For example, subsequent to parsing the CIB received from radio 102a, if a bit position in the received CIB is mapped to a radio ID in the CIL for radio 102b and if the matching bit position is set to a value that indicates that radio 102b is selected participate in the call, radio 102b may join the call by, for example, unmuting the call. In another example, subsequent to parsing the CIB received from radio 102a, if a bit position in the received CIB is mapped to a talkgroup ID in the CIL with which radio 102b is affiliated and if the matching bit position is set to a value that indicates that the talk group is selected participate in the call, radio 102b may join the call by, for example, unmuting the call. In addition, and in some embodiments, if any target talk group ID or radio ID in a target address field is the same as the ID for radio 102b or as the ID for a talkgroup with which radio 102b is affiliated, radio 102b may join the call. The call connections between radio 102a and other radios are indicated by the connecting lines between radio 102a and radios 102b and 102d-102h.

On the other hand, subsequent to parsing the CIB received from radio 102a, if no bit position in the received CIB is mapped via the CIL to a radio ID matching radio 102c or to a talkgroup ID with which radio 102c is affiliated (and in some embodiments, subsequent to parsing the header or link control message, if additionally, the target address field does not include a radio ID matching radio 102c or a talkgroup ID with which radio 102c is affiliated), radio 102c may not join the call.

Radios 102b and 102d-102h may determine that they are or are not selected to participate in the call in a similar manner as radio 102c.

During the call, sending radio 102a may change the radios, talk groups, and/or sub-CILs selected to participate in the call, thereby updating the CIB. Subsequent to receiving an updated CIB, radios 102b and 102d-102h participating in the call may remain on the call or leave the call in accordance with the updated CIB. For example, subsequent to receiving the updated CIB, if radio 102g is no longer selected to participate in the call, radio 102g may leave the call and continue to monitor either a control channel or a traffic channel for the call for a change in the CIB indicating that radio 102g is to rejoin the call. This enables the sending radio to newly include or exclude one or more radios from an ongoing call.

During talking back if, for example, radio 102b is responding to radio 102a and radio 102b does not change the radios, talk groups, and/or sub-CILs selected to participate in the call, radio 102b may send out the same CIB as the one it received from radio 102a to other radios selected to participate in the call.

In a trunked system, the CIB may be initially sent out on a control channel, and then during the call, subsequently sent on a traffic channel. When the traffic channel repeater in the trunked system that is handling the call detects that the CIB for an ongoing call has been updated, the traffic channel repeater may notify a site/zone controller to broadcast the updated CIB on the control channel and to forward the call information with the updated CIB to other sites. Thereafter, radios operating on the same or different sites may be able to join or leave the call by examining the updated CIB.

Figure 2:
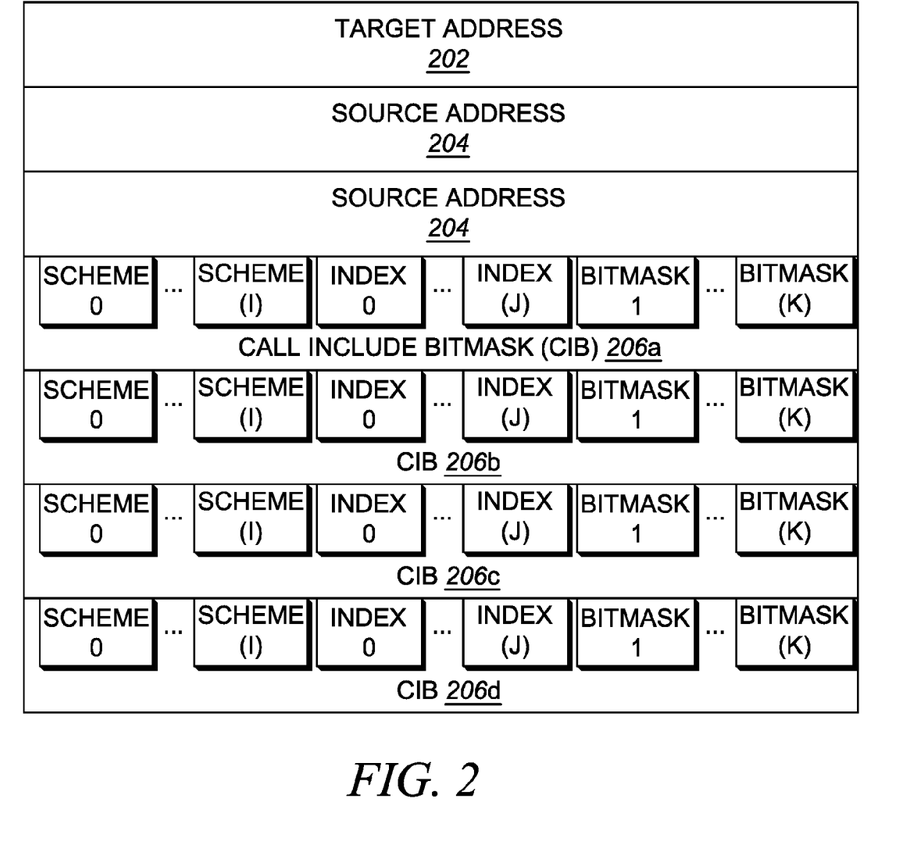
FIG. 2 is a block diagram of a packet used in accordance with some embodiments.

FIG. 2 is a block diagram of a packet used in accordance with some embodiments. Packet 200 may include a one byte target address field 202 (i.e., a field including the address of a receiving radio) and a two byte source address field 204 (i.e., a field including the address of a sending radio). Packet 200 may also include a CIB field 206 (i.e., fields 206a-206d) with up to four bytes. In an embodiment, CIB field 206 may include bits that are used to identify individual radios, talk groups, and/or sub-CILs selected by a sending radio from at least one CIL. In order to associate CIB field 206 with more than one CILs, CIB field 206 may include zero or more scheme fields, zero or more index fields, and one or more bitmask fields, wherein the variable I indicates the number of scheme fields included in CIB field 206, the variable J indicates the number of index fields included in CIB field 206, and the variable K indicates the number of bitmask fields included in CIB field 206.

Each scheme defines how an index field and the bitmask field(s) are to be parsed. Each index defines which of one or more CILs is to be used in parsing the bitmask field(s). Each bitmask field includes bits that are mapped to radio ID(s), talk group ID(s) and/or sub-CIL(s) in a CIL to identify those individual radios and/or talk groups selected by a sending radio to participate in a call.

Using a scheme field, a CIL may be defined as a global CIL or a dedicated CIL. When a CIL is defined as a global CIL, all calls follow the same rule for parsing the index and bitmask fields. If a CIL is defined as a dedicated CIL, parsing of the index and bitmask fields may be performed in a way that is specific to the source and/or target addresses identified in packet 200, the voice header, the data header or the link control message. For example, if a sending radio selects target radios, talk groups and/or sub-CIL(s) for a call and if the selected radios and/or talk groups are related to the sending radio, the source address may be used in parsing the index and bitmask fields. When the source address is used in parsing the index and bitmask fields, the source address may not be changed during the call in order to maintain the CIL scheme during talkback. In an embodiment, even when no push-to-talk ID is provided for talkback, the sending radio may use the source address to direct the receiving radios to mute or unmute the call.

Together with the scheme field, the index field allows for multiple CILs to be used in selecting one or more radios and/or talk groups for a call. The index field may be used in deciding which CIL(s) of the multiple CILs is to be used in parsing the bitmask field(s), wherein when the sending radio selects the receiving radios, talk groups and/or sub-CILs from multiple CILs, the header or link control packets may include fewer bitmask fields. Conversely, when the sending radio selects the receiving radios, talk groups and/or sub- CILs from one CIL (i.e., a global CIL), no index field is used and CIB field 206 sent with the header or link control packets may include relatively more bitmask fields.

Consider an example where no scheme or index is defined in CIB field 206. For an individual call in such an example, there will only be one CIL from which up to 16 targets may be selected and set in 2 bytes of CIB field 206. The CIL may be defined as a global CIL or a dedicated CIL, wherein the index and bitmask fields may be parsed in a way that is specific to the source or target addresses identified in the header. For a group call where no scheme or index is defined in CIB field 206, for any group address, up to 24 targets may be selected from the CIL and set in 3 bytes of CIB field 206. Considering that there may be up to 254 group addresses, each group address may be associated with a dedicated CIL from which up to 24 targets may be selected and set in 3 bytes of CIB field 206. For a group call where no scheme or index is defined in CIB field 206 and where each group address is associated with a dedicated CIL, the source address may be used in determining which dedicated CIL is to be associated with a call.

In an example where there is no scheme defined in CIB field 206 but where one or more indexes are defined in CIB field 206, the variable, J, may be used to indicate that the number of index fields defined in CIB field 206 is greater than 0. In this example, for an individual call there may be a total of $2^J$ CILs. Up to (16-J) targets may be selected from each of the $2^J$ CILs and set in 2 bytes of CIB field 206. Each of the $2^J$ CILs may be defined as a global CIL or as a dedicated CIL according to the source address or target address. For any group address for a group call, there may also be a total of $2^J$ CILs and (24-J) targets may be selected from each of the $2^J$ CILs and may be set in 3 bytes of CIB field 206. Considering that there may be up to 254 group addresses, each group address may be associated with a dedicated CIL from which up to (24-J) targets may be selected and set in 3 bytes of CIB field 206. The source address may be used in selecting those of the $2^J$ dedicated CILs that are to be associated with a call.

In an example where one or more schemes and one or more indexes are defined in CIB 206, the variable, I, may be used to indicate that the number of schemes defined in CIB 206 is greater than 0 and the variable, J, may be used to indicate that the number of indexes defined in CIB 206 is greater than 0. For a group call, one or more CILs may be defined as global CILs for all group addresses or one or more CILs may be defined as a dedicated CIL that is specific to either a source address or a target address. One bit of the scheme field may be allocated to indicate which rule will be followed for the call. For example, if the value of the scheme field is set to 0, an associated index field may include a value for a global CIL; but if the value of the scheme field is set to 1, the associated index field may include a value for one of the $2^J$ CILs.

In the example where $2^I$ schemes are defined in CIB 206 and where there may be $2^J$ global CILs for all group addresses, considering that each scheme defines how an index field and the bitmask field(s) are to be parsed, a scheme field may be used to define an associated index field that may be used to select one CIL defined as a global CIL. In this configuration, the scheme and index fields may be combined to specify one CIL which is defined as a global CIL for all group addresses. With this configuration, a system planner may show some CILs to some subscribers and/or prevent some subscribers from accessing some CILs. Accordingly, the system planner may use the scheme and index fields to make those CILs defined as global CILs for all group addresses available to all subscribers or to restrict access to those CILs defined as dedicated CILs. The system planner may determine which combinations of the scheme, index and bitmask configurations can be made available to some subscribers.

In order to reduce the complexity associated with defining multiple CILs in a multi-site trunking system, the CILs may be defined according to a user configuration associated with the sending radio. Considering that each user may only contact a limited number of target radios and talk groups, basing the CIL configuration on the user configuration makes the CIL configuration easier to define for multiple call scenarios.

To enable a user to invite radios or talk groups that are not included in pre-defined CILs, one or more bits of the CIB may be reserved to add one or more group IDs during runtime. Alternatively, one or more bits of the CIB may be reserved to add one or more global bitmask values. For example, if the maximum number of bits in the CIB associated with one CIL is 16, then 12 bits in the CIB may be pre-mapped to radio IDs in the CIL and 4 bits may be reserved to identify for one or more global bitmasks which identify global individual radio IDs, global talk group IDs and/or IDs for other global CILs. Accordingly, during run time, the user of the sending radio may select up to 4 global targets defined in the system. The global targets may be global targets for the whole system, a target group address and/or a source address. In an embodiment, before radio, talk groups and/or sub-CILs are selected, the sending radio may send out a control packet to broadcast up to four dedicated, pre-configured target addresses which are not included in any CILs. Only the receiving radios capable of receiving this control packet and that are able to parse out the bits with the dedicated target addresses may decide whether to be included into the call. In another embodiment, where there are no pre-configured/known global targets, before sending out the CIB, the user of the sending radio may select 4 targets and include the targets into a control packet that is sent out to all subscribers. Those receiving radios that are able to parse the meaning of bits associated with the selected targets may decide whether to join into the call.

Figure 3:
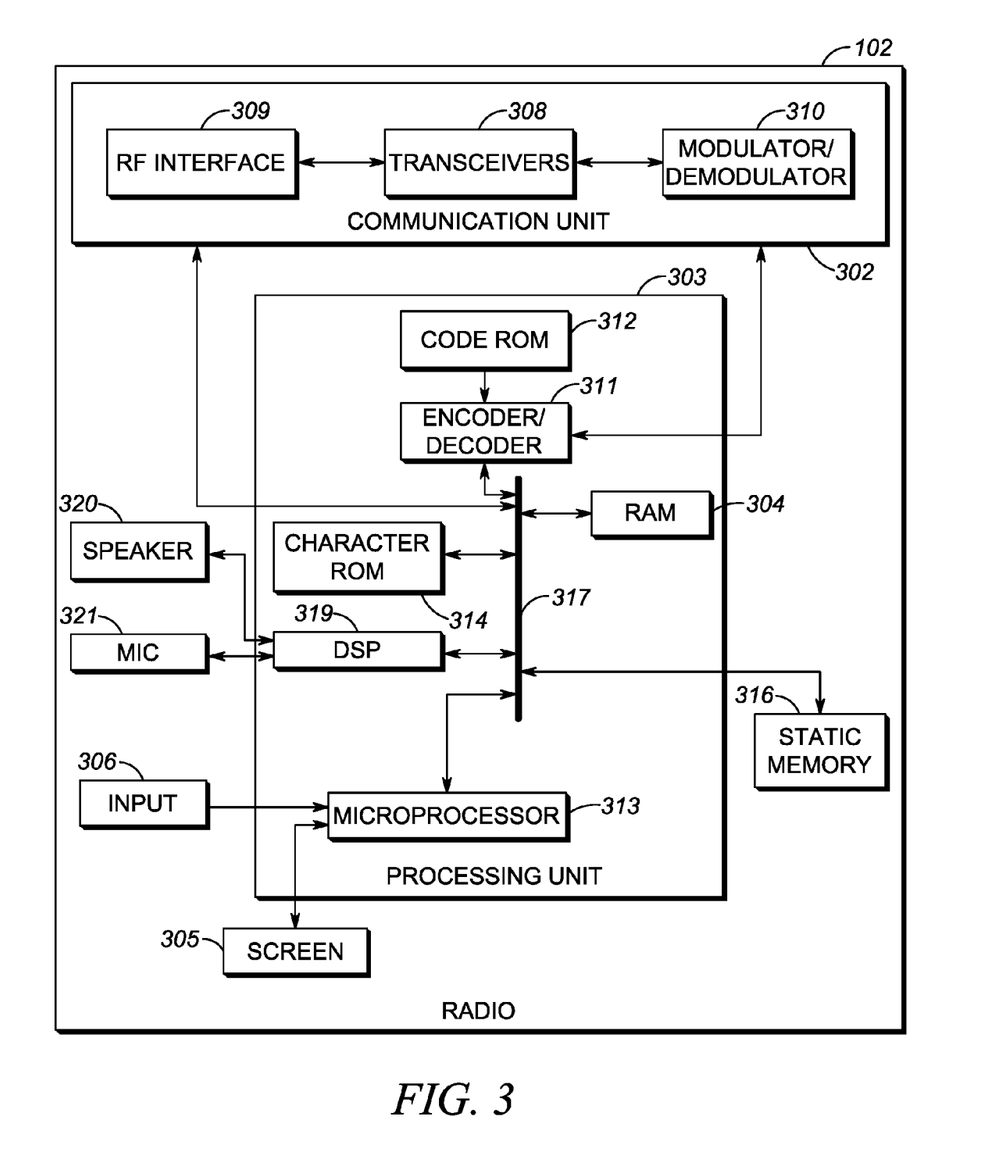
FIG. 3 is a block diagram of a radio used in accordance with some embodiments.

FIG. 3 is a block diagram of a radio used in accordance with some embodiments. Radio 102 includes a communications unit 302 coupled to a common data and address bus 317 of a processing unit 303. Radio 102 may also include an input unit (e.g., keypad, pointing device, etc.) 306, an output transducer unit (e.g., speaker) 320, an input transducer unit (e.g., a microphone) (MIC) 321, and a display screen 305, each coupled to be in communication with the processing unit 303. The speaker/microphone configuration may be configured with Push-To-Talk capability and Voice over IP (VoIP) capability.

Processing unit 303 may include an encoder/decoder 311 with an associated code ROM 312 for storing data for encoding and decoding voice, data, control, or other signals that may be transmitted or received by radio 102. Processing unit 303 may further include a microprocessor 313 coupled, by the common data and address bus 317, to the encoder/decoder 311, a character ROM 314, a RAM 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

Communications unit 302 may include an RF interface 309 configurable to communicate with network components, and other user equipment within its communication range. Communications unit 302 may include one or more broadband and/or narrowband transceivers 308, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 302 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 310 that is coupled to the encoder/decoder 311.

The character ROM 314 stores code for decoding or encoding data such as control, request, or instruction messages, channel change messages, and/or data or voice messages that may be transmitted or received by radio 102. Static memory 316 may store operating code for performing one or more of the steps set forth in FIGS. 4 or 5.

Figure 4:
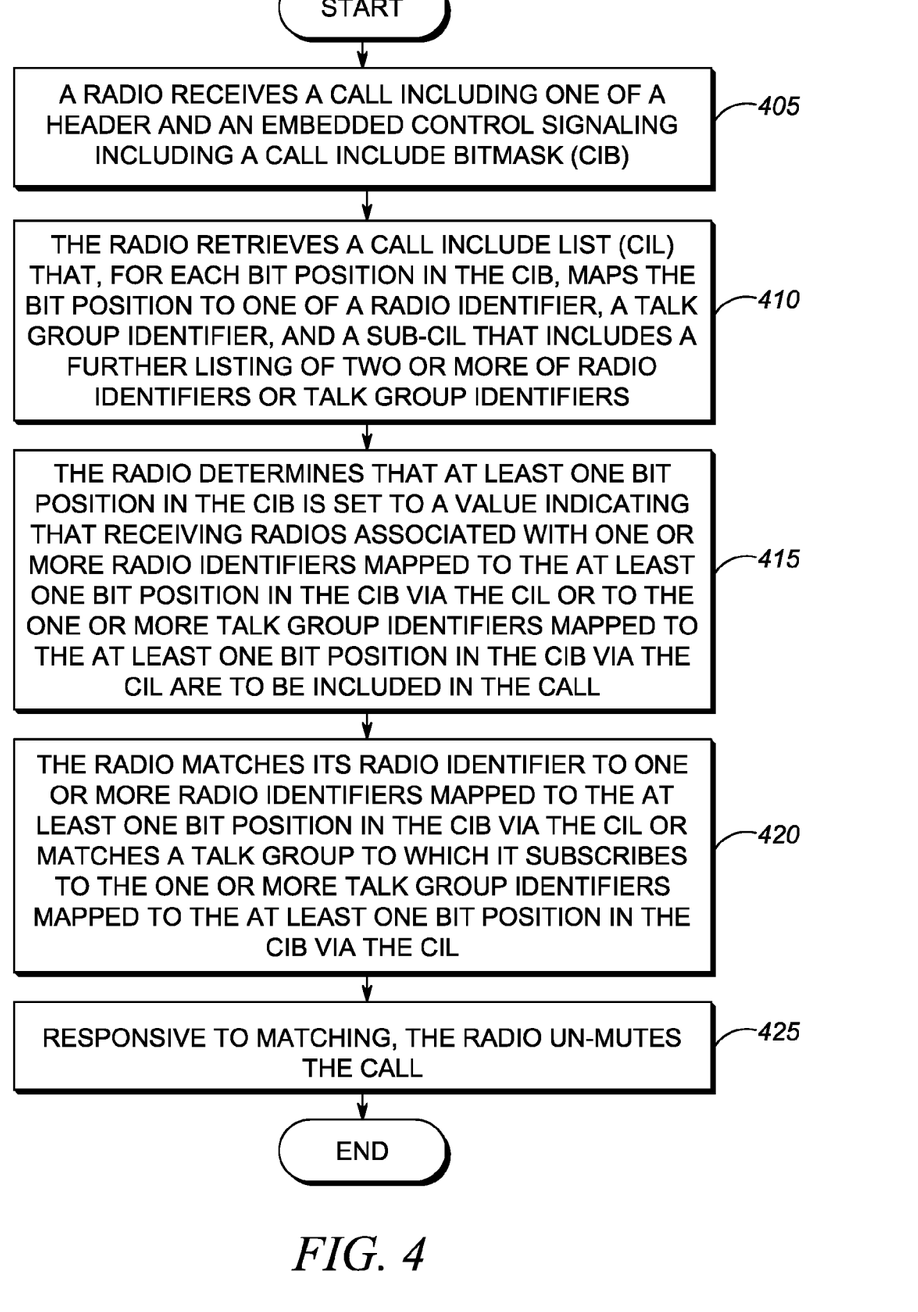
FIG. 4 is a flow diagram of steps implemented in accordance with some embodiments.

FIG. 4 is a flow diagram of steps implemented in accordance with some embodiments. At 405, a radio receives a call including one of a header and an embedded control signaling including a CIB. At 410, the radio retrieves a CIL that, for each bit position in the CIB, maps the bit position to one of a radio identifier, a talk group identifier, and a sub-CIL that includes a further listing of two or more radio identifiers or talk group identifiers. At 415, the radio determines that at least one bit position in the CIB is set to a value indicating that receiving radios associated with one or more radio identifiers mapped to the at least one bit position in the CIB via the CIL or to the one or more talk group identifiers mapped to the at least one bit position in the CIB via the CIL are to be included in the call. At 420, the radio matches its radio identifier to one or more radio identifiers mapped to the at least one bit position in the CIB via the CIL or matches a talk group to which it subscribes to the one or more talk group identifiers mapped to the at least one bit position in the CIB via the CIL. At 425, responsive to matching, the radio unmutes the call. In some embodiments, at step 425, the radio may also unmute if the target address field of the call matches the radio ID of the radio or identifies a talkgroup to which the radio subscribes.

Figure 5:
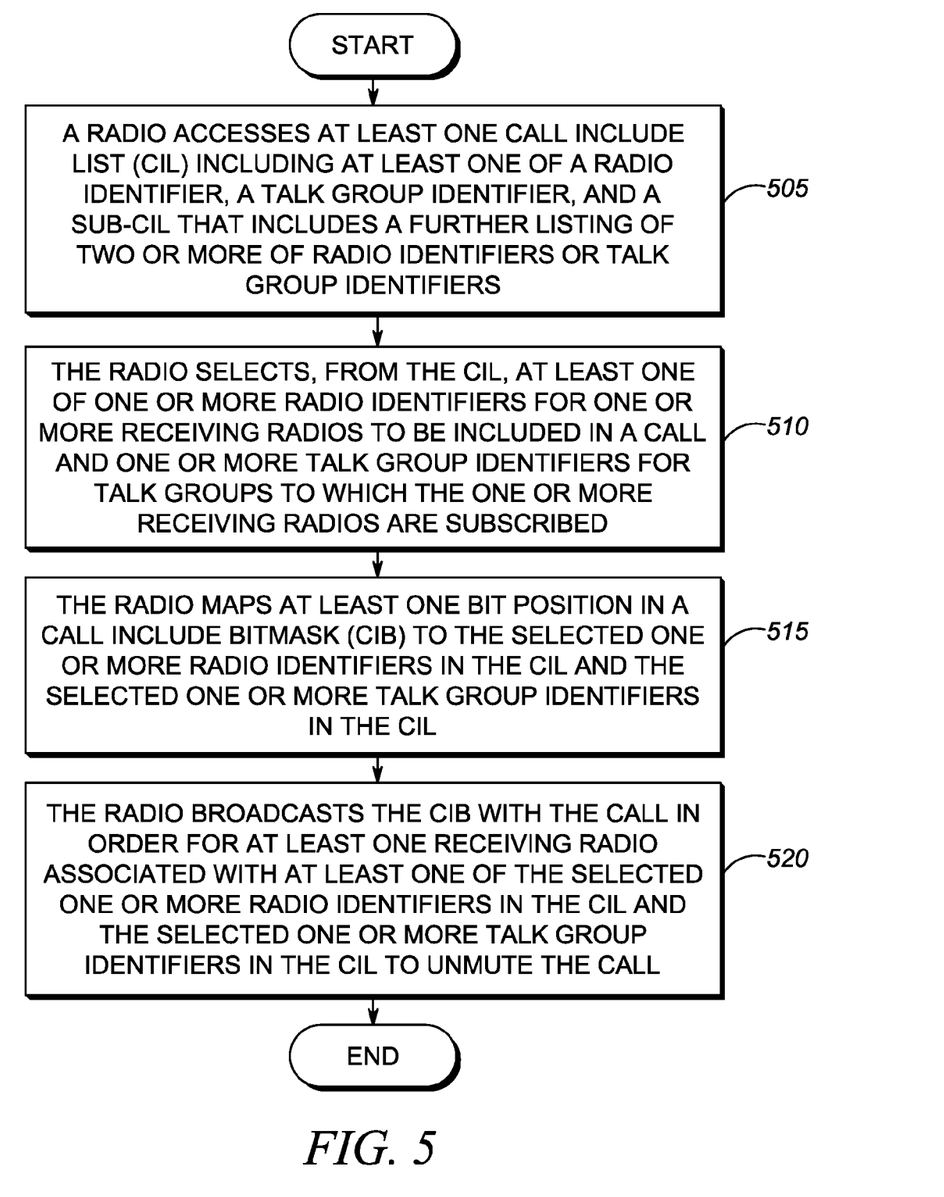
FIG. 5 is another flow diagram of steps implemented in accordance with some embodiments.

FIG. 5 is another flow diagram of steps implemented in accordance with some embodiments. At 505, a radio accesses at least one CIL including at least one of a radio identifier, a talk group identifier, and a sub-CIL that includes a further listing of two or more radio identifiers or talk group identifiers. At 510, the radio selects, from the CIL, at least one of one or more radio identifiers for one or more receiving radios to be included in a call and one or more talk group identifiers for talk groups to which the one or more receiving radios are subscribed. At 515, the radio maps at least one bit position in a CIB to the selected one or more radio identifiers in the CIL and the selected one or more talk group identifiers in the CIL. At 520, the radio broadcasts the CIB with the call, perhaps in one or a header ore embedded control signaling, in order for at least one receiving radio associated with at least one of the selected one or more radio identifiers in the CIL and the selected one or more talk group identifiers in the CIL to unmute the call. In some embodiments, the radio may also include one talk group identifier or a target radio ID in the target address field of the header or embedded control signaling for inclusion in the call. The talk group or radio ID in the target address field may identify target radios or talk groups different than those identified via the CIB, or may duplicate a target radio or talk group identified via the CIB.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, by a first receiving radio, a call including one of a header and an embedded control signaling including a call include bitmask (CIB);
   retrieving, by the first receiving radio, a call include list (CIL) that, for each bit position in the CIB, maps the bit position to one of a radio identifier, a talk group identifier, and a sub-CIL that includes a further listing of two or more of radio identifiers or talk group identifiers;
   determining, by the first receiving radio, that at least one bit position in the CIB is set to a value indicating that receiving radios associated with one or more radio identifiers mapped to the at least one bit position in the CIB via the CIL or associated with the one or more talk group identifiers mapped to the at least one bit position in the CIB via the CIL are to be included in the call;
   matching, by the first receiving radio, a radio identifier of the first receiving radio to the one or more radio identifiers mapped to the at least one bit position in the CIB via the CIL or matching a talk group to which the first receiving radio is subscribed to the one or more talk group identifiers mapped to the at least one bit position in the CIB via the CIL; and
   responsive to matching, by the first receiving radio, unmuting the call.

2. The method of claim 1, further comprising responsive to determining that the at least one bit position in the CIB does not map to the radio identifier of the first receiving radio or that the one or more talk group identifiers mapped to the at least one bit position in the CIB via the CIL do not match a talk group to which the first receiving radio is subscribed, leaving, by the first receiving radio, the call and continuing to monitor one of a control channel and a traffic channel for the call for a change in the CIB indicating that the first receiving radio is to rejoin the call.

3. The method of claim 1, wherein subsequent to detecting a change in the CIB, a traffic channel repeater notifies a site controller to broadcast an updated CIB on the control channel.

4. The method of claim 1, further comprising transmitting, by the first receiving radio, the CIB to other radios involved in the call during talkback if the first receiving radio does not update the radios selected to participate in the call.

5. The method of claim 1, retrieving, by the first receiving radio from the CIB, at least one of:
   a scheme field for defining how an index field and a bitmask field in the CIB are to be parsed by the first receiving radio,
   the index field for defining the CIL as one of a plurality of CILs to be used in parsing the bitmask field, and
   at least one bitmask field including the at least one bit position.

6. The method of claim 5, further comprising defining the CIL in the scheme field as one of:
   a global CIL wherein the call follows one rule for parsing at least one of the index field and the bitmask field; or
   a dedicated CIL wherein the call follows a rule for parsing at least one of the index field and the bitmask field based on one of a source address or a target address associated with the call.

7. The method of claim 5, further comprising defining the CIL in the scheme field as a dedicated CIL wherein at least one of the index field and the bitmask field are parsed based on a source address and the source address is used in directing the first receiving radio to join the call.

8. The method of claim 1, where the CIL is configured based on a user configuration.

9. The method of claim 1, wherein the determining further comprises determining, by the first receiving radio, that the at least one bit position in the CIB is set to a value indicating that one or more radios associated with at least one of a global radio identifier, a global talk group identifier and a global sub-CIL identifier mapped to the at least one bit position in the CIB via the CIL are to be included in the call,
   wherein the global radio identifier, the global talk group identifier and the global sub-CIL identifier are associated with at least one of a system wide configuration, a source address configuration and a target address configuration.

10. An apparatus comprising:
    a memory configured to store at least one call include list (CIL);
    a transceiver; and
    a processor configured to:
      receive, via the transceiver, a call including one of a header and an embedded control signaling including a call include bitmask (CIB);
      retrieve a CIL that, for each bit position in the CIB, maps the bit position to one of a radio identifier, a talk group identifier, and a sub-CIL that includes a further listing of two or more of radio identifiers or talk group identifiers;
      determine that at least one bit position in the CIB is set to a value indicating that receiving radios associated with one or more radio identifiers mapped to the at least one bit position in the CIB via the CIL or associated with one or more talk group identifiers mapped to the at least one bit position in the CIB via the CIL are to be included in the call;
match a radio identifier of the first receiving radio to the one or more radio identifiers mapped to the at least one bit position in the CIB via the CIL or match a talk group to which the first receiving radio is subscribed to the one or more talk group identifiers mapped to the at least one bit position in the CIB via the CIL; and
responsive to matching, unmute the call.

11. The apparatus of claim 10, wherein responsive to determining that the at least one bit position in the CIB does not map to the radio identifier of the first receiving radio or that the one or more talk group identifiers mapped to the at least one bit position in the CIB via the CIL do not match the talk group to which the first receiving radio is subscribed, the processor is configured to leave the call and to continue to monitor one of a control channel and a traffic channel for the call for a change in the CIB indicating that the first receiving radio is to rejoin the call.

12. The apparatus of claim 10, wherein the processor is configured to transmit the CIB to other radios involved in the call during talkback if the first receiving radio does not update the radios selected to participate in the call.

13. The apparatus of claim 10, wherein the processor is configured to retrieve from the CIB at least one of:
a scheme field for defining how an index field and a bitmask field in the CIB are to be parsed by the first receiving radio,
the index field for defining the CIL as one of a plurality of CILs to be used in parsing the bitmask field, and
at least one bitmask field including at least one bit position.

14. The apparatus of claim 10, wherein the CIL is defined in the scheme field as one of:
a global CIL wherein the call follows one rule for parsing at least one of the index field and the bitmask field; or
a dedicated CIL wherein the call follows a rule for parsing at least one of the index field and the bitmask field based on one of a source address and a target address associated with the call.

15. The apparatus of claim 10, wherein the CIL is defined in the scheme field as a dedicated CIL wherein at least one of the index field and the bitmask field are parsed based on a source address and the source address is used in directing the first receiving radio to join the call.

16. The apparatus of claim 10, wherein the processor is configured to determine that the at least one bit position in the CIB is set to a value indicating that one or more radios associated with at least one of a global radio identifier, a global talk group identifier and a global sub-CIL identifier mapped to the at least one bit position in the CIB via the CIL are to be included in the call,
wherein the global radio identifier, the global talk group identifier and the global sub-CIL identifier are associated with at least one of a system wide configuration, a source address configuration and a target address configuration.

17. A method comprising:
accessing, by a radio, at least one call include list (CIL) including at least one of a radio identifier, a talk group identifier, and a sub-CIL that includes a further listing of two or more of radio identifiers or talk group identifiers;
selecting, by the radio from the CIL, at least one of one or more radio identifiers for one or more receiving radios to be included in a call and one or more talk group identifiers for talk groups to which the one or more receiving radios are subscribed;
mapping, by the radio, at least one bit position in a call include bitmask (CIB) to the selected one or more radio identifiers in the CIL and the selected one or more talk group identifiers in the CIL; and
broadcasting, by the radio, the CIB with the call in order for at least one receiving radio associated with at least one of the selected one or more radio identifiers in the CIL and the selected one or more talk group identifiers in the CIL to unmute the call.

18. The method of claim 17, wherein the mapping comprises setting at least one of:
a scheme field for defining how an index field and a bitmask field in the CIB are to be parsed by the at least one receiving radio,
the index field for defining the CIL as one of a plurality of CILs to be used in parsing the bitmask field by, and
at least one bitmask field including the at least one bit position.

19. The method of claim 18, further comprising defining the CIL in the scheme field as one of:
a global CIL wherein the call follows one rule for parsing at least one of the index field and the bitmask field; or
a dedicated CIL wherein the call follows a rule for parsing at least one of the index field and the bitmask field based on one of a source address and a target address associated with the call.

20. The method of claim 18, further comprising defining the CIL in the scheme field as a dedicated CIL wherein at least one of the index field and the bitmask field are parsed based on a source address and the source address is used in directing a receiving radio to join the call.

* * * * *